(12) United States Patent
Raichle et al.

(10) Patent No.: US 9,154,051 B2
(45) Date of Patent: Oct. 6, 2015

(54) OPERATING STATE CIRCUIT FOR AN INVERTER AND METHOD FOR SETTING OPERATING STATES OF AN INVERTER

(71) Applicant: Robert Bosch GmbH, Stuttgart (DE)

(72) Inventors: Daniel Raichle, Vaihingen (DE); Andreas Schoenknecht, Renningen (DE); Edwin Eberlein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/426,299

(22) PCT Filed: Jul. 22, 2013

(86) PCT No.: PCT/EP2013/065375
§ 371 (c)(1),
(2) Date: Mar. 5, 2015

(87) PCT Pub. No.: WO2014/037143
PCT Pub. Date: Mar. 13, 2014

(65) Prior Publication Data
US 2015/0214858 A1    Jul. 30, 2015

(30) Foreign Application Priority Data

Sep. 10, 2012 (DE) .......................... 10 2012 216 008

(51) Int. Cl.
H02M 1/38       (2007.01)
H02M 7/537      (2006.01)
H02M 7/5387     (2007.01)

(52) U.S. Cl.
CPC ................ *H02M 7/537* (2013.01); *H02M 1/38* (2013.01); *H02M 7/5387* (2013.01)

(58) Field of Classification Search
CPC . H02M 1/38; H02M 2001/385; H02M 7/537; H02M 7/5387; H02M 7/53871
USPC .................................. 363/55–56.05, 131, 132
See application file for complete search history.

(56) References Cited

U.S. PATENT DOCUMENTS 5,594,634 A * 1/1997 Rajashekara et al. ........... 363/98
8,278,854 B2 * 10/2012 Imura ...................... 318/400.21
(Continued)

FOREIGN PATENT DOCUMENTS

| DE | 102006003254 | 7/2007 |
| DE | 102009028502 | 2/2011 |
| DE | 102009047616 | 6/2011 |
| DE | 102011081173 | 2/2013 |
| DE | 102011086079 | 5/2013 |

(Continued)

OTHER PUBLICATIONS

International Search Report for Application No. PCT/2013/065375 dated Feb. 27, 2014 (English Translation, 2 pages).

*Primary Examiner* — Jessica Han
(74) *Attorney, Agent, or Firm* — Michael Best & Friedrich LLP

(57) ABSTRACT

The invention relates to an operating state circuit for driving an inverter with half-bridges having respective switching devices, which inverter supplies an n-phase supply voltage to an n-phase electrical machine via phase connections associated with the respective half-bridges, where n≥1. The operating state circuit comprises an evaluation device, which is connected to the phase connections of the inverter and to input connections of the inverter and is designed to detect an input voltage of the inverter and phase currents at the phase connections of the inverter, and a drive device which is coupled to the evaluation device and is designed to switch the inverter from a short-circuit state to a freewheeling mode on the basis of the detected input voltage, wherein the evaluation device is designed to generate a freewheeling trigger signal and to output said signal to the drive device if the detected input voltage is lower than an adjustable freewheeling threshold value, and wherein the drive device is designed to change the respective switching devices of the half-bridges to an open state after receiving the freewheeling trigger signal only when the particular phase current detected at the associated phase connection has a zero crossing or a current direction coming from the inverter.

10 Claims, 2 Drawing Sheets

(56) References Cited

U.S. PATENT DOCUMENTS

| | | |
|---|---|---|
| 8,730,700 B2 * | 5/2014 | Yuzurihara et al. ............ 363/127 |
| 2007/0194734 A1 * | 8/2007 | Weinmann et al. ............ 318/439 |
| 2012/0200248 A1 * | 8/2012 | Schleser ....................... 318/490 |
| 2012/0206075 A1 * | 8/2012 | Kimpara et al. ......... 318/400.15 |

FOREIGN PATENT DOCUMENTS

| | | |
|---|---|---|
| EP | 1816739 | 8/2007 |
| JP | 605791 | 1/1985 |
| WO | 2012000710 | 1/2012 |

* cited by examiner

OPERATING STATE CIRCUIT FOR AN INVERTER AND METHOD FOR SETTING OPERATING STATES OF AN INVERTER

BACKGROUND OF THE INVENTION

The present invention relates to an operating state circuit for an inverter and a method for setting operating states of an inverter, in particular for an inverter for supplying power to a synchronous machine.

Electric drives of hybrid or electric vehicles may include permanently excited electric machines, in particular synchronous machines, which are supplied with AC voltage by means of a pulse-controlled inverter. In the event of fault states on the low-voltage side, for example, in the event of a failure of the electronic control, the energy supply, various sensors, the data communication, or a fuse, it may be necessary to set a safe state in the inverter i.e., a switching state of the inverter in which safety remains ensured for persons accessing the vehicle such as first responders in the event of an accident, and for the integrity of the electrical system.

Generally, a control device of the inverter is supplied by the low-voltage system of the vehicle. In the event of a failure of the low-voltage supply, a control device of the inverter may switch the inverter independently to a safe state in order to prevent possible damage to electrical components, for example, as a result of an uncontrolled energy input into the DC voltage intermediate circuit from which the inverter is fed. Various circuit states may be achieved in conventional methods.

For example, all switches connected to the low potential, so-called low-side switches, may be closed, and all switches connected to the high potential, so-called high-side switches, may be opened. This operating mode is also referred to as a short-circuit state to low potential. Alternatively, all high-side switches may be closed, and all low-side switches may be opened, so that a short-circuit state to high potential is created. In another shutdown method, all switches of the pulse-controlled inverter are opened. This is also referred to as freewheeling mode.

For example, a combination of shutdown methods is known from publication DE 10 2006 003 254 A1. For example, since the phase current may still rise for a short time after switching to the short-circuit state, it is provided there to use both known shutdown operating modes sequentially and to switch the electric machine initially to freewheeling mode and subsequently to the short-circuit state.

Publication DE 10 2009 047 616 A1 describes an inverter circuit for an electric machine which is able to be transferred in the event of a fault from an active short circuit operating state to a freewheeling operating state.

Publication WO 2012/000710 A2 describes a method for operating an at least three-phase electric machine used as a drive assembly in a motor vehicle, which is actuated via an inverter, in particular a pulse-controlled inverter, the inverter including switching elements in the form of half bridges, and in each case a half bridge being electrically connected to a phase of the electric machine. If a first switching element of a first half bridge connected to a first phase is permanently closed on account of failure, then, according to the present invention, a second switching element of the first half bridge is permanently opened and, in a first angular range of an electrical rotation, which is uninfluenced by the first phase, all switching elements of the additional half bridges are actuated in the usual manner.

In a short-circuit state, a braking torque forms which is generated by the generator operation of the synchronous machine. For example, if the car is towed, the braking torque is a hindrance. In particular at low rotational speeds, the braking torque of the electric machine caused by the short-circuit state is relatively high. Publication JP 60005791 A1, for example, provides for using a torque limiter which is controllable as a function of the intermediate circuit voltage to limit the braking torque, in order to prevent overloading of the intermediate-circuit capacitor.

There is therefore a need for solutions for controlling an inverter in an electric drive system including an electric machine, in which operating states of the inverter may be set in a safe and efficient manner even in the event of a failure of the low-voltage supply of the controller.

SUMMARY OF THE INVENTION

According to one aspect, the present invention provides an operating state circuit for controlling an inverter including half bridges, each having switching devices, which supplies an n-phase electric machine with an n-phase supply voltage via phase connections associated with the respective half bridges, where n≥1. The operating state circuit includes an evaluation device which is connected to the phase connections of the inverter on the one hand, and to input terminals of the inverter on the other hand, and which is designed to detect an input voltage of the inverter and phase currents at the phase connections of the inverter, and a control device which is coupled to the evaluation device and which is designed to switch the inverter from a short-circuit state to a freewheeling mode as a function of the detected input voltage, wherein the evaluation device is designed to generate a freewheeling trigger signal and to output it to the control device if the detected input voltage is less than an adjustable freewheeling threshold value, and wherein the control device is designed to transfer the respective switching devices of the half bridges to an open state after receiving the freewheeling trigger signal only if the respective phase current at the associated phase connection has a zero crossing or a current direction pointing out of the inverter.

According to another aspect, the present invention provides an electric drive system including a DC voltage intermediate circuit which is designed to be supplied with a DC voltage by a high-voltage source, an inverter including half bridges, each having switching devices, which is connected to the DC voltage intermediate circuit and which is designed to provide an n-phase supply voltage for an n-phase electric machine at n phase connections, where n≥1, and an operating state circuit according to the present invention which is designed to control the plurality of switching devices of the inverter for setting a freewheeling state or an active short circuit.

According to another aspect, the present invention provides a method for setting operating states of an inverter which includes half bridges having respective switching devices and which supplies an n-phase electric machine with an n-phase supply voltage via phase connections associated with the respective half bridges, where n≥1. The method includes the steps of detecting an input voltage of the inverter, detecting phase currents at the phase connections of the inverter, generating a freewheeling trigger signal if the detected input voltage is less than an adjustable freewheeling threshold value, and switching the inverter from a short-circuit state to a freewheeling mode as a function of the detected input voltage. After receiving the freewheeling trigger signal, the respective switching devices of the half bridges are transferred to an open state only if the respective detected phase current at the associated phase connection has a zero crossing or a current direction pointing out of the inverter.

One idea of the present invention is, when changing the operating state of an inverter of an electric machine, in particular of a synchronous machine, from an active short-circuit state to a freewheeling mode, to monitor the instantaneous phase currents in the inverter and to control the half bridges of the inverter individually and separately from each other. Thus, one or more of the switching devices of a half bridge are transferred from a conducting state to a blocking state only if the phase current has a zero crossing or the phase current flows from the inverter into the electric machine at the instant of the change in the operating state.

One advantage of this approach is that no energy input into the DC voltage intermediate circuit takes place, so that the freewheeling mode is able to be maintained longer. Since no braking torque occurs in freewheeling mode, for example, in the event of the occurrence of a malfunction during travel using an electrically driven vehicle, smoother coasting may result. In addition, the power required for towing an electrically driven vehicle is reduced. In some fault events, for example, in the event of a failure of the low-voltage supply, in the event of a failure of the low-voltage-side detection of the position of the rotor of the electric machine, in the event of a failure of other low-voltage-side electronic control components or other low-voltage malfunctions, the electrically driven vehicle may be pushed without having to overcome the braking torque of the electric machine in the active short-circuit state.

Advantageously, a load or thermal overload of the inverter in the active short-circuit state is prevented, since no short-circuit currents occur in freewheeling mode. This is then advantageous in particular if the cooling system of the inverter is not functional due the lack of a low-voltage energy supply.

According to one specific embodiment of the operating state circuit, the evaluation device may be designed to detect output voltages of the inverter at the phase connections and in particular to ascertain a rotational speed of the electric machine based on the detected output voltages. The adjustable freewheeling threshold value may have a first voltage threshold value if the ascertained rotational speed is below an adjustable rotational speed threshold value, and may have a second voltage threshold value which is less than the first voltage threshold value if the ascertained rotational speed is above the adjustable rotational speed threshold value. At high rotational speeds, the braking torque generated by the electric machine is lower than at low rotational speeds, so that above the adjustable rotational speed threshold value, the protection of the DC voltage intermediate circuit with respect to overvoltages may be prioritized by already setting the active short-circuit state at lower input voltages.

According to another specific embodiment of the operating state circuit, the control device may include a hardware circuit which is designed to keep the inverter in a short-circuit state as long as the detected input voltage is greater than an adjustable short-circuit threshold value. This advantageously ensures that the voltage in the DC voltage intermediate circuit is not able to exceed a safety-critical threshold value. For example, the adjustable short-circuit threshold value may correspond to the minimum battery voltage of the high-voltage battery, which is lowered by a safety margin.

According to another specific embodiment of the operating state circuit, the adjustable short-circuit threshold value may correspond to the adjustable freewheeling threshold value if the ascertained rotational speed is below the adjustable rotational speed threshold value, and wherein the adjustable short-circuit threshold value is greater than the adjustable freewheeling threshold value if the ascertained rotational speed is above the adjustable speed threshold value. As a result, the adjustable freewheeling threshold value may be flexibly varied between the minimum required switching threshold value for the energy supply of the control of the switching devices of the inverter and the adjustable short-circuit threshold value, in order to be able to ensure a preferably long freewheeling time and thus a preferably low average mean braking torque by the electric machine in the low rotational speed ranges.

According to one specific embodiment of the electric drive system according to the present invention, the drive system may furthermore include an n-phase electric machine whose power terminals are coupled to the phase connections of the inverter. Advantageously, this may be a permanently excited synchronous machine.

According to another specific embodiment of the electric drive system according to the present invention, the DC voltage intermediate circuit may be coupled to the operating state circuit, and is designed to supply the operating state circuit with electric energy. This makes possible an autonomous energy supply of the operating state circuit which is independent of the energy supply from the low-voltage side. In particular in the event of a failure of the low-voltage energy supply, for example, in the event of a defect or a malfunction, or in the event of towing an electrically driven vehicle equipped with the electric drive system according to the present invention, this may ensure a reliable implementation of an operating state control of the inverter.

According to one specific embodiment of the method according to the present invention, the method may furthermore include the steps of detecting the output voltages of the inverter at the phase connections of the inverter, and ascertaining the rotational speed of the electric machine, in particular based on the detected output voltages. The adjustable freewheeling threshold value may have a first voltage threshold value if the ascertained rotational speed is below an adjustable rotational speed threshold value, and may have a second voltage threshold value which is less than the first voltage threshold value if the ascertained rotational speed is above the adjustable rotational speed threshold value.

According to another specific embodiment of the method according to the present invention, the method may furthermore include the step of keeping the inverter in a short-circuit state as long as the detected input voltage is greater than the adjustable freewheeling threshold value.

BRIEF DESCRIPTION OF THE DRAWINGS

Additional features and advantages of specific embodiments of the present invention result from the following description with reference to the appended drawings.

DETAILED DESCRIPTION

Figure 1:
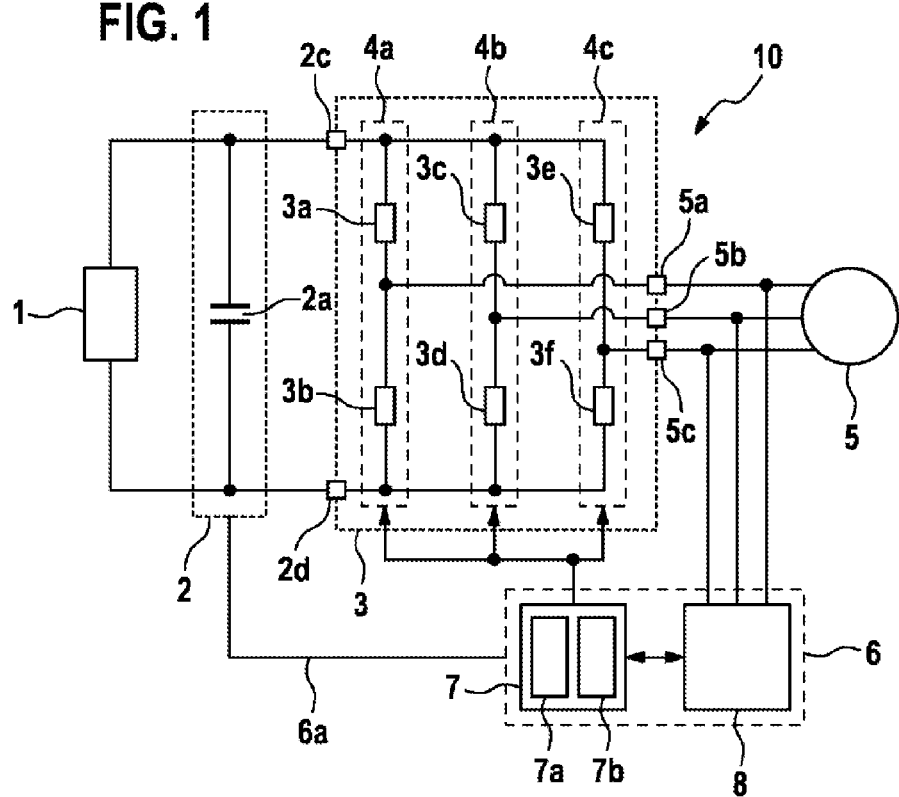
FIG. 1 shows a schematic representation of an electric drive system according to one specific embodiment of the present invention.

In the figures, identical and functionally identical elements, features, and components are provided with the same reference numbers, unless stated otherwise. It is to be understood that for reasons of clarity, components and elements in the drawings are not necessarily depicted true to scale.

Additional possible embodiments and refinements and implementations of the present invention also include combinations of features of the invention described above or below which are not explicitly specified.

FIG. 1 shows a schematic representation of an electric drive system 10. The electric drive system 10 includes a high-voltage energy source 1, for example, a high-voltage source such as a traction battery, which is able to provide a supply voltage. The high-voltage energy source 1 may be designed in a drive system of an electrically driven vehicle, for example, as an energy store 1. It is also possible that the high-voltage energy source 1 is grid-based, i.e., that the electric drive system obtains electric energy from an electric power grid. The supply voltage of the high-voltage energy source 1 may be applied via an intermediate circuit 2 having an intermediate-circuit capacitor 2a to supply terminals 2c and 2d of an inverter 3, for example, of a pulse-controlled inverter. One terminal of the high-voltage energy source 1 is at a high potential, and one terminal of the high-voltage energy source 1 is at a low potential, for example, ground. The inverter 3 may, for example, have a three-phase output having phase connections 5a, 5b, 5c, which are connected to a three-phase electric machine 5 via power terminals. The electric machine 5 may, for example, be a synchronous machine 5 or a synchronous motor 5.

In the present example of FIG. 1, the inverter 3 is designed as a full-bridge circuit or B6 bridge. For this purpose, the inverter 3 includes upper half-bridge switches including switching devices 3a, 3c, 3e referenced to high potential and lower half-bridge switches having switching devices 3b, 3d, 3f referenced to low potential. Each two of the half-bridge switches are each equipped as a half bridge 4a, 4b, and 4c having a center tap. The switching devices 3a to 3f may, for example, each include power semiconductors. The switching devices 3a to 3f may, for example, include field-effect transistor switches such as n-MOSFETs (n-type metal oxide semiconductor field-effect transistors, enhancement mode), JFETs (junction field-effect transistors), or p-MOSFETs (p-type metal oxide semiconductor field-effect transistors). The switching devices 3a to 3f may also include IGBTs (insulated gate bipolar transistors, bipolar transistors having an insulated gate electrode).

The inverter 3 is able to generate a three-phase AC voltage for controlling the electric machine 5 via corresponding control of the switching devices 3a to 3f. For this purpose, a corresponding phase voltage is generated at the respective phase connections 5a, 5b, 5c of the inverter 3. In the example depicted in FIG. 1, three phase connections and a B6 bridge are shown, wherein any other number of phase connections having a corresponding number of half-bridge branches or half bridges is also possible. The switching devices 3a, 3c, 3e are referred to as high-side switches, and the switching devices 3b, 3d, 3f are referred to as low-side switches.

The inverter 3 is designed to switch the phase connections 5a, 5b, 5c of the electric machine 5 alternately to a high supply potential, for example the supply voltage, or a low reference potential, for example, a ground potential, via corresponding control of the switching devices 3a to 3f. The inverter 3 determines the power and operating type of the electric machine 5 and is correspondingly controlled by the control device 7. The electric machine 5 may thus be optionally operated as a motor or a generator, for example, in an electric drive system of an electric or hybrid vehicle. During motor operation, it generates an additional drive torque which supports an internal combustion engine, for example, during an acceleration phase. On the other hand, during generator operation, mechanical energy may be converted into electric energy and stored in the energy store 1 or fed back into an electric power supply grid.

In addition to the control device 7, the electric drive system includes an evaluation device 8. The control device 7 and the evaluation device 8 may be integrated into an operating state circuit 6, for example, in a microcontroller. The operating state circuit 6 may, for example, be coupled to the DC voltage intermediate circuit 2 in order to be supplied with electric energy by the high-voltage side of the inverter 3. However, in the normal case, a low-voltage energy supply device, which is not shown, is provided, which supplies the operating state circuit 6 with electric energy from the low-voltage side of the inverter 3, i.e., in a regular control operation via the low-voltage side.

A freewheeling mode of the inverter 3 is characterized in that all switching devices 3a to 3f are open, i.e., are in a blocking state, and a current which is possibly present in the electric machine 5 may be conducted via the freewheeling diodes associated with the switching devices 3a to 3f and thus reduced or entirely dissipated. In a first short-circuit state of the inverter 3, the low-side switches 3b, 3d, 3f are closed, while the high-side switches 3a, 3c, 3e are open. In this state, the phase connections 5a, 5b, 5c are thus each connected to the input terminal 2d. As a result, a current flow is made possible through the freewheeling diodes of the low-side switches 3b, 3d, 3f or through the low-side switches 3b, 3d, 3f. However, in a second short-circuit state of the inverter 3, the low-side switches 3b, 3d, 3f are open, while the high-side switches 3a, 3c, 3e are closed. Thus, in this state, the phase connections 5a, 5b, 5c are each connected to the input terminal 2c. As a result, a current flow is made possible through the freewheeling diodes of the high-side switches 3a, 3c, 3e or through the high-side switches 3a, 3c, 3e.

In the event of the failure of the low-voltage energy supply or the low-voltage system, the high-voltage side of the inverter assumes the energy supply of the operating state circuit 6 and in particular of the control device 7 for the inverters 3. In order for the control device 7 to be able to set the operating state of the active short circuit, i.e., one of the aforementioned first and second short-circuit states, the intermediate circuit voltage must be above a minimum threshold value in order to switch on the switching devices 3a to 3f reliably. Without a targeted control strategy, the intermediate circuit voltage drops during a first period until it falls below the minimum threshold value, and the switching devices 3a to 3f are automatically opened. As a result, the electric machine 5 recharges the intermediate circuit very rapidly using the energy stored at this instant in the stator inductances, so that the intermediate circuit voltage rises again above the minimum threshold value, and it is possible to establish the short-circuit state again. This procedure is repeated, the intermediate circuit voltage having a sawtooth-like time profile at periodic intervals as a result of the rapid charging. The ratio of the total period in which the inverter 3 in this situation is in a short-circuit state, to the total period in which the inverter 3 is in a freewheeling mode, is very high, so that an approximately constant braking torque is applied to the vehicle. This braking torque is relatively high in particular at low rotational speeds of the electric machine 5.

Figure 2:
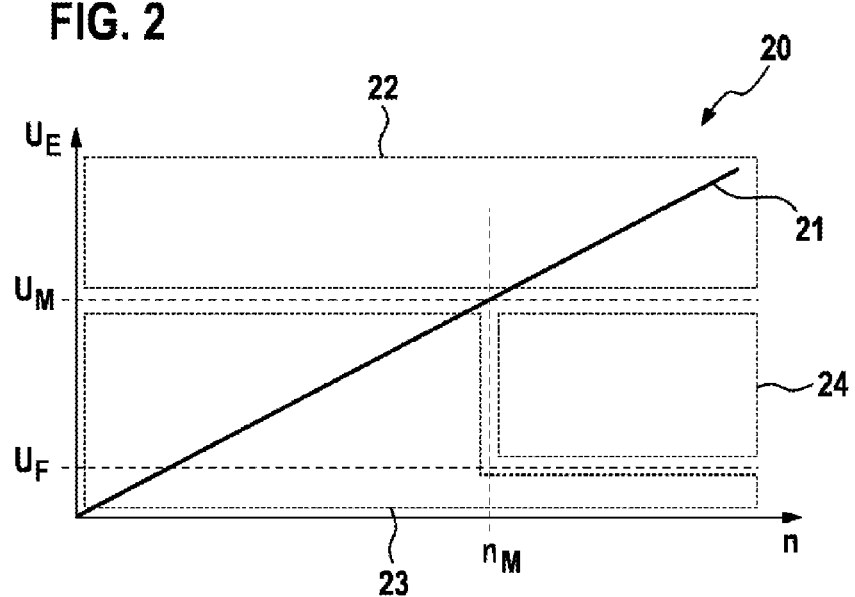
FIG. 2 shows a schematic representation of an operating state diagram for controlling an inverter of an electric drive system according to another specific embodiment of the present invention.

FIG. 2 shows a schematic representation of an operating state diagram 20 for controlling an inverter of an electric drive system. For example, the operating state diagram 20 may be used for a control strategy of the inverter 3 of the electric drive system 10 in FIG. 1. The control strategy may be implemented via the operating state circuit 6 in FIG. 1.

For this purpose, the evaluation device 8 of FIG. 1 is connected to the phase connections 5a, 5b, 5c of the inverter 3 and may be designed to detect output voltages of the inverter 3. In particular, the evaluation device 8 may be designed to detect induced rotor voltages in the electric machine 5. The evaluation device 8 may, for example, include a microcontroller which converts the rotor voltage into an instantaneous rotational speed n or rotor frequency of the electric machine 5. Of course, the instantaneous rotational speed n may also be detected or ascertained via other sensors or detection devices. In addition, the evaluation device 8 may detect an input voltage $U_E$ at the input terminals 2c, 2d of the inverter 3. This may, for example, be carried out via the high-voltage supply line 6a which is available in any case, via which the operating state circuit 6 is supplied with electric energy.

As a function of the ascertained rotational speed n and the input voltage $U_E$ at the input terminals 2c, 2d of the inverter 3, the control device 7 may then control the switching devices 3a to 3f of the inverter 3 in such a way that an operating state is set according to the exemplary operating ranges 22, 23, 24 depicted in FIG. 2. The profile 21 shows the maximum intermediate circuit voltage which may be set in freewheeling mode as a function of the rotational speed n of the electric machine 3. For example, the high-side switches may always remain blocked.

At low rotational speeds, the electric machine 5 may generate a high braking torque, so that the control device 7 is designed to set a freewheeling state in the inverter 3 if the instantaneous rotational speed n ascertained in the evaluation device 8 falls below a predetermined rotational speed threshold value $n_M$. However, at high rotational speeds, the high induced rotor voltage may exceed the voltage in the DC voltage intermediate circuit 2 and generate high charging currents on the high-voltage side of the inverter or exceed a critical limit value (for example, 60 volts), which may result in damage to the power electronics and the high-voltage energy source 1. In this case, the control device 7 may be designed to set an active short-circuit state in the inverter 3 if the instantaneous rotational speed n ascertained in the evaluation device 8 exceeds the predetermined rotational speed threshold value $n_M$.

The voltage in the DC voltage intermediate circuit 2 is in the range 22, i.e., the input voltage $U_E$ of the inverter 3 is above a predetermined or predeterminable short-circuit threshold value $U_M$. This short-circuit threshold value $U_M$ may, for example, correspond to a value which is lowered by a certain amount relative to a minimum operating voltage of the high-voltage energy source 1. For example, the short-circuit threshold value $U_M$ may be established at 90% of the minimum operating voltage of the high-voltage energy source 1. Above this short-circuit threshold value $U_M$, the inverter 3 is always kept in an active short-circuit state by the control device 7 in order to prevent an overvoltage in the DC voltage intermediate circuit 2. For this purpose, the control device 7 may have a hardware circuit 7b which is designed to keep the inverter 3 in a short-circuit state as long as the detected input voltage $U_E$ is greater than the adjustable short-circuit threshold value $U_M$. For safety reasons, this adjustable short-circuit threshold value $U_M$ may be determined independently of the current rotational speed n of the electric machine 5. The hardware circuit 7b may, for example, be integrated as a comparator circuit which compares the input voltage $U_E$ to the adjustable short-circuit threshold value $U_M$ and prioritizes the short-circuit state relative to all other operating states of the inverter 3. The short-circuit state may also be ensured using the energy supply via the high-voltage side, since the voltage of the DC voltage intermediate circuit 2 is always high enough.

Depending on the rotational speed range of the electric machine 5, two different control ranges 23 and 24 may be implemented below the adjustable short-circuit threshold value $U_M$. The control range 23 is a control range in which the control device 7 is designed to control the respective switching devices 3a to 3f of the half bridges 4a, 4b, 4c of the inverter in a freewheeling mode. For this purpose, the evaluation device 8 may be designed to generate a freewheeling trigger signal and to output it to the control device 7 if the detected input voltage $U_E$ is less than an adjustable freewheeling threshold value. The adjustable freewheeling threshold value may be a function of the rotational speed. For example, in a lower rotational speed range below a rotational speed threshold $n_M$ of the electric machine 5, the adjustable freewheeling threshold value may correspond to the adjustable short-circuit threshold value $U_M$. Above the rotational speed threshold value $n_M$ of the electric machine 5, the adjustable freewheeling threshold value may correspond to a freewheeling threshold value $U_F$ which is lowered with respect to the adjustable short-circuit threshold value $U_M$.

The freewheeling threshold value $U_F$ may correspond to a voltage value which is slightly higher than the minimum voltage in the DC voltage intermediate circuit 2 required for a reliable control of the switching devices 3a to 3f of the inverter 3. For example, this minimum required voltage may be 30 volts. The freewheeling threshold value $U_F$ may in this case, for example, be established at approximately 60 volts.

After receiving the freewheeling trigger signal, the control device 7 may be designed to transfer the respective switching devices 3a to 3f of the half bridges 4a, 4b, 4c to an open state only if the respective detected phase current at the associated phase connection 5a, 5b, 5c has a zero crossing or a current direction pointing out of the inverter 3. As a result, it may be ensured that the conditions for a currentless switching (ZCS, "zero current switching") are always ensured. As a consequence, at the time of switching to freewheeling mode, no energy is stored in the stator inductances of the electric machine 5, which would discharge abruptly into the DC voltage intermediate circuit 2 due to the blocking of the switching devices 3a to 3f. As a result, the voltage in the DC voltage intermediate circuit 2 does not rise in an uncontrolled manner, and freewheeling mode may be maintained for a relatively long time.

Figure 3:
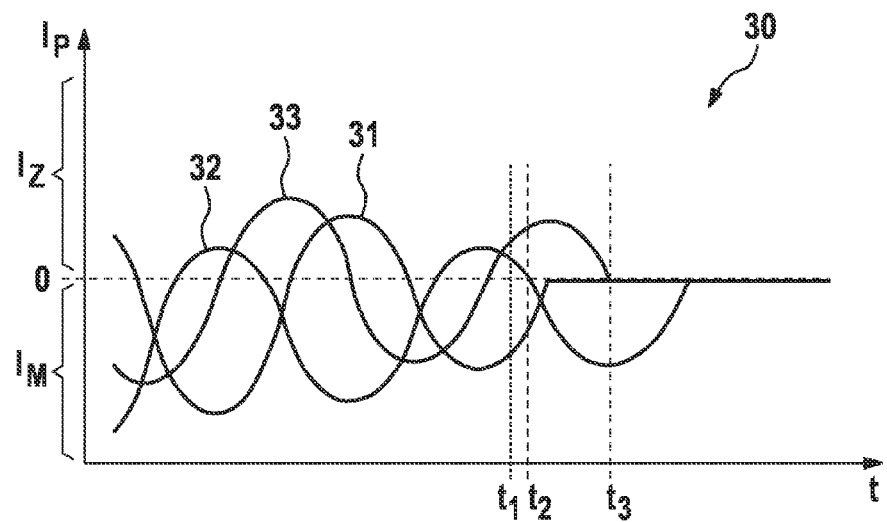
FIG. 3 shows a schematic representation of a current-time diagram for the phase currents of an inverter when changing the operating states of an inverter according to another specific embodiment of the present invention.

The maximization of the period during which the inverter 3 may be operated in freewheeling mode simultaneously minimizes the braking torque averaged over time, which may be transmitted to the shaft of the electric drive system by the electric machine 5. FIG. 3 shows a schematic representation of a current-time diagram 30 for the phase currents $I_p$ of an inverter when changing the operating states of the inverter. The current-time diagram 30 may, for example, apply to phase current profiles 31, 32, and 33 of a three-phase inverter 3, as depicted in FIG. 1. The current-time diagram 30 applies, for example, to a change from one of the control ranges 22 or 24 to the control range 23, in which the control device 7 transfers the inverter 3 from an active short-circuit state to a freewheeling mode.

At an instant t1, a freewheeling trigger signal is output by the evaluation device 8, for example, if a corresponding operating state change condition has been fulfilled as a function of the ascertained rotational speed n and/or the ascertained input voltage $U_E$ of the inverter 3. At this instant, the two phase current profiles 32 and 33 have a phase current value $I_Z$ which runs from the electric machine 5 into the inverter 3. If the switching devices of the half bridges of the inverter 3 associated with the two phase current profiles 32 and 33 were to be transferred to a closed state at instant t1, the electric energy stored in the corresponding stator inductances of the electric machine 5 would discharge abruptly into the DC voltage intermediate circuit 2, which would result in an uncontrolled and thus undesirable rise of the voltage in the DC voltage intermediate circuit 2. At instant t1, i.e., after receiving the freewheeling trigger signal from the evaluation device 8, the control device 7 therefore initially keeps the switching devices of the half bridges associated with the two phase current profiles 32 and 33 in a conducting state.

However, the phase current profile 31 has a phase current value $I_M$ which runs from the inverter 3 into the electric machine 5. Thus, the control device 7 is able to transfer the half bridges of the inverter 3 or its switching devices associated with the phase current profile 31 to a closed state already at instant t1. After the phase current has flowed completely into the stator inductance of the electric machine 5 at a later instant, the phase current remains at zero due to the freewheeling state into which this half bridge has been set.

After instant t1, i.e., after receiving the freewheeling trigger signal from the evaluation device 8, the control device 7 subsequently monitors the two phase current profiles 32 and 33. At respective points in time t2 and t3 at which the phase current profiles 32 and 33 then have zero crossings of the phase current, each of the associated half bridges or their switching devices may also be switched to freewheeling mode. A typical time delay between the output of the freewheeling trigger signal and the full activation of freewheeling mode in the inverter 3 may be several milliseconds. On the other hand, however, the DC voltage intermediate circuit 2 is not charged to high voltages making the immediate setting of a short-circuit state necessary, the dissipation of which may take up to one second. This means that freewheeling mode may on average be maintained considerably longer, which consequently also minimizes the braking torque generated on average by the electric machine 5.

Figure 4:
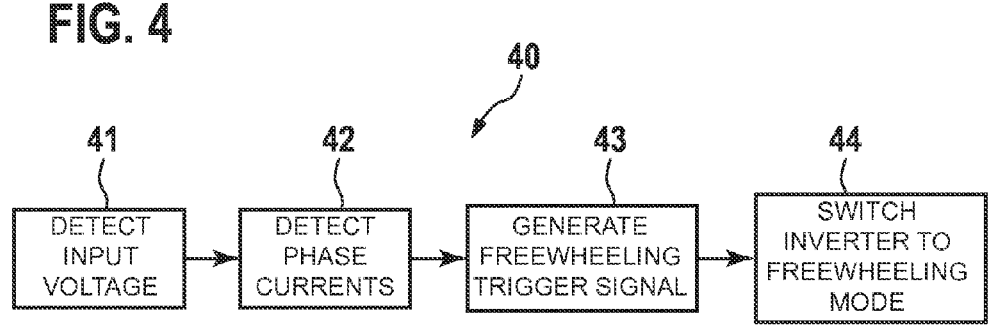
FIG. 4 shows a schematic representation of a method for setting operating states of an inverter according to another specific embodiment of the present invention.

FIG. 4 shows a schematic representation of a method 40 for operating an inverter. The method 40 may in particular be used for setting operating states of the inverter 3 in FIG. 1, which supplies an n-phase electric machine 5 with an n-phase supply voltage via phase connections 5a, 5b, 5c. In a first step 41, the method 40 includes a detection of an input voltage $U_E$ of the inverter 3. In a second step 42, phase currents may be detected at the phase connections 5a, 5b, 5c of the inverter 3. In a step 43, a freewheeling trigger signal may be generated, for example, by the evaluation device 8 shown in FIG. 1, if the detected input voltage $U_E$ is less than an adjustable freewheeling threshold value $U_M$ or $U_F$. Then, in a step 44, switching of the inverter from a short-circuit state to a freewheeling mode may be carried out as a function of the detected input voltage $U_E$.

When switching to freewheeling mode, the respective switching devices 3a to 3f of the half bridges 4a, 4b, 4c are transferred to an open state after receiving the freewheeling trigger signal only if the respective detected phase current has a zero crossing or a current direction pointing out of the inverter 3 at the associated phase connection 5a, 5b, 5c.

Optionally, the method 40 may furthermore include the steps of detecting the output voltages of the inverter 3 at the phase connections 5a, 5b, 5c of the inverter 3, and ascertaining the rotational speed n of the electric machine 5, in particular based on the detected output voltages. The adjustable freewheeling threshold value may be varied according to FIG. 2 between first and second voltage threshold values, depending on the rotational speed range of the ascertained rotational speed n. In addition, the inverter 3 may optionally be kept in a short-circuit state as long as the detected input voltage $U_E$ is greater than the adjustable freewheeling threshold value, regardless of the detected rotational speed n.

The invention claimed is:

1. An operating state circuit for controlling an inverter including half bridges, each having switching devices, which supplies an n-phase electric machine with an n-phase supply voltage via phase connections associated with the respective half bridges, where n≥1, including:
   an evaluation device which is connected to the phase connections of the inverter, and to input terminals of the inverter on the other hand, and which is designed to detect an input voltage of the inverter and phase currents at the phase connections of the inverter; and a control device which is coupled to the evaluation device and which is designed to switch the inverter from a short-circuit state to a freewheeling mode as a function of the detected input voltage,
   wherein the evaluation device is designed to generate a freewheeling trigger signal and to output it to the control device if the detected input voltage is less than an adjustable freewheeling threshold value, and
   wherein the control device is designed to transfer the respective switching devices of the half bridges to an open state after receiving the freewheeling trigger signal only if the respective detected phase current at the associated phase connection has a zero crossing or a current direction pointing out of the inverter.

2. The operating state circuit as claimed in claim 1, wherein the evaluation device is designed to detect output voltages of the inverter at the phase connections, and
   wherein the adjustable freewheeling threshold value has a first voltage threshold value if the ascertained rotational speed is below an adjustable rotational speed threshold value, and has a second voltage threshold value which is less than the first voltage threshold value if the ascertained rotational speed is above the adjustable rotational speed threshold value.

3. The operating state circuit as claimed in claim 1, wherein the control device includes a hardware circuit which is designed to keep the inverter in a short-circuit state as long as the detected input voltage is greater than an adjustable short-circuit threshold value.

4. The operating state circuit as claimed in claim 3, wherein the adjustable short-circuit threshold value corresponds to the adjustable freewheeling threshold value if the ascertained rotational speed is below the adjustable rotational speed threshold value, and wherein the adjustable short-circuit threshold value is greater than the adjustable freewheeling threshold value if the ascertained rotational speed is above the adjustable rotational speed threshold value.

5. An electric drive system, including:
   a DC voltage intermediate circuit, which is designed to be supplied with a DC voltage by a high-voltage source; an inverter including half bridges, each having switching devices, which is connected to the DC voltage intermediate circuit and which is designed to provide an n-phase supply voltage for an n-phase electric machine at n phase connections, where n≥1; and an operating state circuit as claimed in claim 1, which is designed to control the plurality of switching devices of the inverter for setting a freewheeling state or an active short circuit.

6. The electric drive system as claimed in claim 5, furthermore including:

an n-phase electric machine whose power terminals are coupled to the phase connections of the inverter.

7. The electric drive system as claimed in claim 5, wherein the DC voltage intermediate circuit is coupled to the operating state circuit and is designed to supply the operating state circuit with electric energy.

8. A method for setting operating states of an inverter which includes half bridges having respective switching devices and which supplies an n-phase electric machine with an n-phase supply voltage via phase connections associated with the respective half bridges, where n≥1, including the steps of:

detecting an input voltage of the inverter;

detecting phase currents at the phase connections of the inverter; generating a freewheeling trigger signal if the detected input voltage is less than an adjustable freewheeling threshold value; and switching the inverter from a short-circuit state to a freewheeling mode as a function of the detected input voltage, wherein after receiving the freewheeling trigger signal, the respective switching devices of the half bridges are transferred to an open state only if the respective detected phase current at the phase connection has a zero crossing or a current direction pointing out of the inverter.

9. The method as claimed in claim 8, furthermore including the steps of:

detecting the output voltages of the inverter at the phase connections of the inverter; and ascertaining the rotational speed of the electric machine, wherein the adjustable freewheeling threshold value has a first voltage threshold value if the ascertained rotational speed is below an adjustable rotational speed threshold value, and has a second voltage threshold value which is less than the first voltage threshold value if the ascertained rotational speed is above the adjustable rotational speed threshold value.

10. The method as claimed in claim 8, furthermore having the step of keeping the inverter in a short-circuit state as long as the detected input voltage is greater than the adjustable freewheeling threshold value.

* * * * *